Patented Aug. 30, 1938

2,128,325

UNITED STATES PATENT OFFICE 2,128,325

COPPER CONTAINING MONOAZO DYESTUFFS AND PROCESS FOR PREPARING THEM

Francis Leslie Rose, Blackley, England, assignor to Imperial Chemical Industries Limited, a corporation of Great Britain No Drawing. Application September 2, 1936, Serial No. 99,122. In Great Britain September 13, 1935

12 Claims. (Cl. 260—151)

The present invention relates to new copper containing monoazo dyestuffs.

In British specification No. 12932/1915 there are described copper containing substantive monoazo dyestuffs derived from o-amino phenols and various derivatives of 2-amino-5-naphthol-7-sulfonic acids.

One of the objects of the present invention is to manufacture new copper containing monoazo dyes. A further object is to manufacture new copper containing monoazo dyes which are substantive to cellulose fibers. A further object is to produce new copper containing monoazo dyestuffs which are particularly valuable in respect of shade, affinity for cellulose fibers and fastness to light. Further objects of this invention will be disclosed or apparent from the following description.

These objects are obtained by treating with a copper salt, in aqueous medium, monoazo dyestuffs of the following general formula

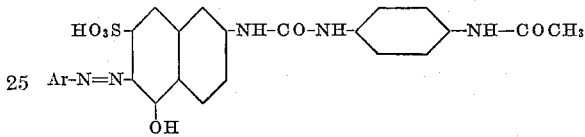

where Ar is a benzene or naphthalene residue having a substituent which favours the formation of complex metal derivatives, that is to say, either a hydroxyl or carboxy group in the ortho position to the azo nitrogen and which residue may carry as further substituents chlorine, nitro or sulfonic acid groups.

The monoazo dyestuffs, having the above general formula, which are used as starting materials for the present invention may be prepared by coupling 4'-acetaminophenyl-5-hydroxy-2-naphthylurea-7-sulfonic acid in aqueous alkaline medium with suitable diazotized components such as, for example, 2-aminophenol, anthranilic acid, nitro-2-aminophenol sulfonic acids or chlornitro-2-aminophenol sulfonic acids, 2-amino-5-sulphobenzoic acid and 2-aminonaphthalene-3-carboxylic acid. In general it is not necessary to isolate the parent dyestuff from the coupling medium in which it is formed before the treatment with a copper salt according to the invention. If desired, however, the parent dyestuff may be isolated and purified before such treatment. As copper salts we may use, for example, copper sulfate, copper acetate or cuprammonium solutions obtained by adding ammonia to aqueous solutions of such salts.

The following examples, in which the parts are by weight, illustrate but do not limit the invention.

Example 1

13.7 parts of 2-aminobenzoic acid dissolved in 200 parts of water and 26 parts of concentrated hydrochloric acid (36%) are diazotized at 0° C. with an aqueous solution of 6.9 parts of sodium nitrite. The diazo solution is added with stirring to an ice-cold solution of 41.5 parts of 4'-acetaminophenyl 5-hydroxy-2-naphthylurea-7-sulfonic acid (prepared as described in British Patent 5895/02) in 500 parts of water and 30 parts of calcined sodium carbonate. After 6 hours, coupling is complete and the alkaline coupling liquor so-obtained is heated to 95° C. A solution of 30 parts of crystallized copper sulfate in 100 parts of water is added during 15 minutes and the mixture is then stirred at 95° C. for 1 hour. The reaction mixture is then cooled to 70° C. and the copper complex salted out with common salt, filtered off and dried.

The new copper-containing dyestuff dyes cotton in red-brown shades of excellent fastness to light.

If instead of 2-aminobenzoic acid in the above example, there is used 20.6 parts of 4:5-dichloro-2-aminobenzoic acid, there is obtained a copper-containing dyestuff of a deeper brown shade but possessing the same excellent fastness properties.

Example 2

15.4 parts of 4-nitro-2-aminophenol are diazotized in 500 parts of water and 26 parts of concentrated hydrochloric acid (36%) at 0° C. with an aqueous solution of 6.9 parts of sodium nitrite. The diazo solution is coupled at 0° C. with 41.5 parts of the urea from monoacetyl-p-phenylenediamine and J-acid dissolved in 500 parts of water and 30 parts of calcined sodium carbonate. When coupling is complete, a new copper-containing dyestuff can be obtained by the addition of a solution of 30 parts of crystallized copper sulfate in 100 parts of water to the heated coupling liquor in the manner described in Example 1.

The resulting isolated and dried product is a blackish powder which dyes cotton in red violet shades of very good fastness to light.

If, in Example 2, there are used 14.3 parts of 4-chloro-2-aminophenol or 14.3 parts of 6-chloro-2-aminophenol-4-sulfonic acid instead of 4-nitro-2-aminophenol, there are obtained new copper-containing dyestuffs which dye cotton in bluer shades of violet having similar excellent fastness properties.

In the examples given above, although copper sulfate is the only copper salt mentioned, I could equally well use copper acetate or the cuprammonium solutions obtained by adding ammonia to aqueous solutions of copper sulfate or copper acetate.

The new copper-containing dyestuffs made according to the present invention have good affinity for cellulose fibers to which they may be applied by the methods customary for the application of the so-called direct dyestuffs. They dye cotton and viscose artificial silk in red brown to violet shades of excellent fastness to light.

As many apparently widely different embodiments of this invention may be made without departing from the spirit and scope thereof, it is to be understood that I do not limit myself to the specific embodiments thereof except as defined in the appended claims.

I claim:

1. A process for the manufacture of copper containing dyestuffs which comprises treating with a copper salt in aqueous medium, monoazo dyestuffs of the general formula

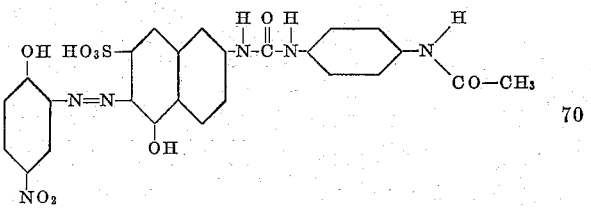

in which Ar is the radical of one of the group consisting of benzene, naphthalene and the chloro, nitro and sulfo substituted derivatives thereof, and X is a group which favors the formation of complex metal derivatives and is ortho to the azo bridge.

2. The compound which is made by treating with a soluble copper salt in aqueous medium, a monazo dyestuff represented by the formula

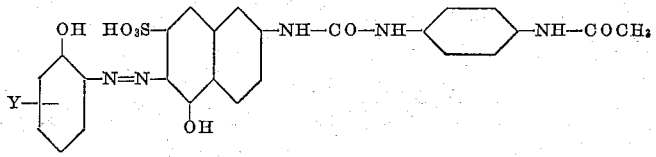

in which Y is at least one of the group consisting of hydrogen, chloro, nitro and sulfonic acid.

3. The compound which is made by treating with a soluble copper salt in aqueous medium, a monazo dyestuff represented by the formula

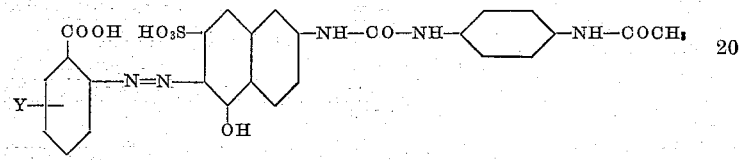

in which Y is at least one of the group consisting of hydrogen, chloro, nitro and sulfonic acid.

4. The process which comprises treating with a copper salt in aqueous medium a monazo dyestuff represented by the formula

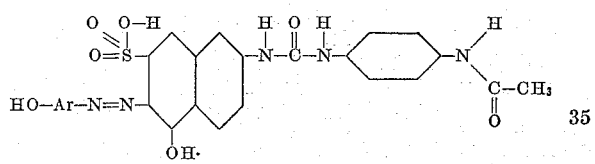

in which Ar is the radical of a chloro-benzene compound substituted by OH in the ortho position to the azo bridge.

5. The process which comprises treating with a copper salt in aqueous medium a monazo dyestuff represented by the formula

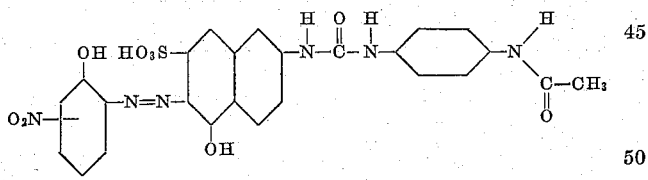

6. The process which comprises treating with a copper salt in aqueous medium a monazo dyestuff represented by the formula

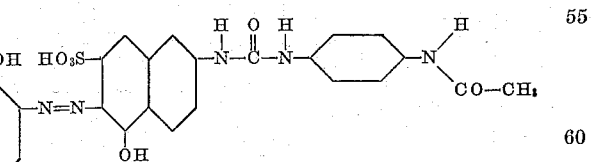

7. The process which comprises treating with a copper salt in aqueous medium a monazo dyestuff represented by the formula 8. The compound obtainable by treating with a soluble copper salt in aqueous medium, a monazo dyestuff represented by the formula

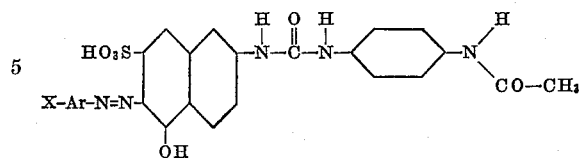

in which Ar is the radical of one of the group consisting of benzene and the chloro, nitro and sulfo substituted derivatives thereof, and X is one of the group consisting of hydroxy and carboxyl and is ortho to the azo bridge.

9. The compound obtainable by treating with a soluble copper salt in aqueous medium, a monazo dyestuff represented by the formula

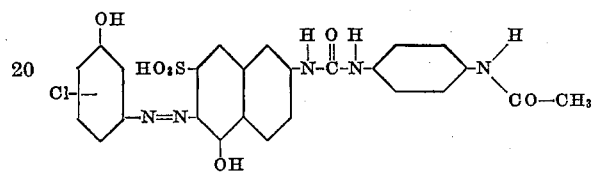

10. The compound obtainable by treating with a soluble copper salt in aqueous medium, a monazo dyestuff represented by the formula

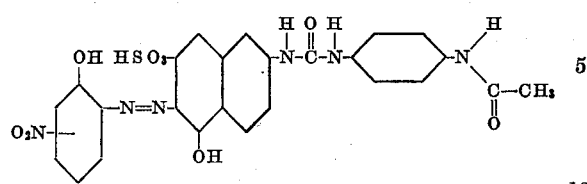

11. The compound obtainable by treating with a soluble copper salt in aqueous medium, a monazo dyestuff represented by the formula

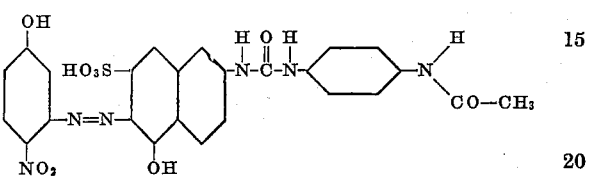

12. The compound obtainable by treating with a soluble copper salt in aqueous medium, a monazo dyestuff represented by the formula

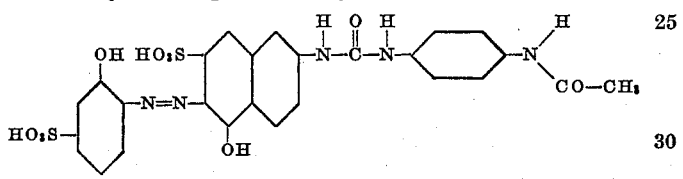

FRANCIS LESLIE ROSE.